Feb. 6, 1940.　　　K. E. JONES　　　2,189,036

REAMER

Original Filed Dec. 16, 1938

Inventor
K. E. JONES.
J. Vincent Martin
and
Ralph R. Browning
Attorneys.

Patented Feb. 6, 1940

2,189,036

UNITED STATES PATENT OFFICE 2,189,036

REAMER

Kenneth E. Jones, Houston, Tex., assignor to Reed Roller Bit Company, Houston, Tex., a corporation of Texas Application December 16, 1938, Serial No. 246,183
Renewed August 9, 1939

6 Claims. (Cl. 255—73)

This invention relates to reamers for use in the drilling of wells. It has for its general object the provision of a structure whereby a reamer cutter of the roller type may be firmly and rigidly mounted within a cutter recess in a reamer body.

In mounting reamer cutters within their recesses it is desirable that they be mounted as firmly as possible and it is desirable that there be no possibility of play between any of the parts constituting the mounting during the operation of the reamer.

It is, therefore, an object of this invention to provide a structure for mounting a reamer cutter in a recess in the side of the reamer body in such a manner as to give the greatest possible degree of rigidity to the mounting, prevent any play or lost motion between the parts of the mounting during operation, and to eliminate any parts which might easily be broken, distorted or dislodged during the operation.

It is a further object to provide a structure of the type set forth in which no welding, or the like, is employed in mounting a reamer cutter within a cutter recess in a reamer body, or in removing the same therefrom. Another object is to provide a means for quickly and easily removing a reamer cutter from its mounting in its reamer body and replacing the same in such mounting without necessity for any special skill or for any special tools not ordinarily at hand.

It is a further object to provide a structure of the type set forth in which a cutter assembly, consisting of a cutter, a cutter pin and end supports therefor, may be secured to a reamer body and removed therefrom as a unit, and in which the parts of such assembly or unit may be promptly assembled in proper relation with respect to each other so as to insure proper mounting of the cutter.

Other objects and advantages of this invention will become apparent from the following description taken in connection with the accompanying drawing, it being understood that the same are by way of illustration and example only.

Figure 2:
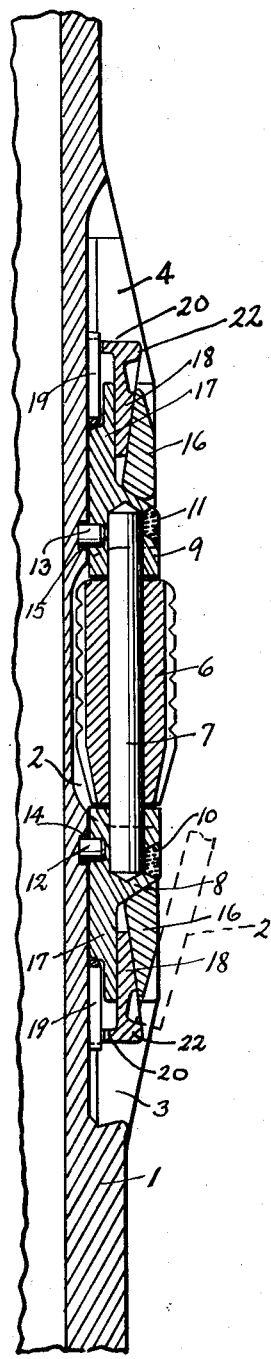
Fig. 2 is a vertical cross section through one wall of the reamer body illustrated in Fig. 1 and through one of the cutters mounted therein, the same being taken along the line 2—2 of Fig. 1.
Figure 1:
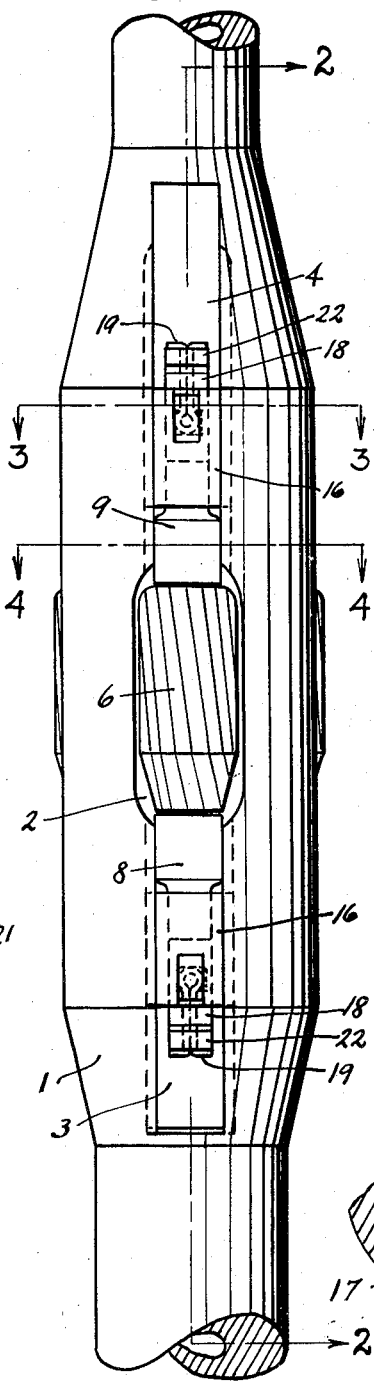
Fig. 1 is a side elevation of a reamer body constructed in accordance with this invention showing the reamer cutters in place therein.
Figure 3:
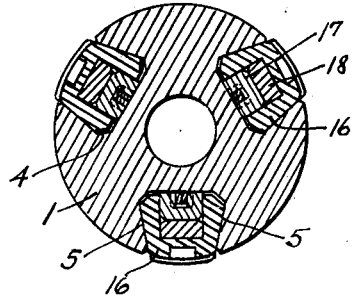
Fig. 3 is a horizontal cross section taken along the line 3—3 of Fig. 1.
Figure 4:
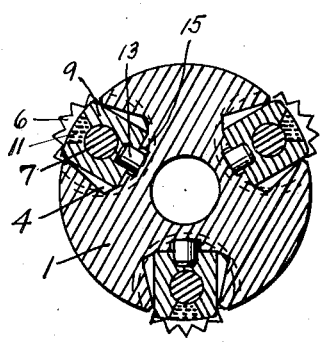
Fig. 4 is a horizontal cross section taken along the line 4—4 of Fig. 1.

In accordance with this invention, a reamer body 1 is formed with a major recess 2 and with auxiliary recesses 3 and 4, respectively, at the opposite ends of and opening into the major recess. These auxiliary recesses are of the cross sectional shape illustrated in Figs. 3 and 4, and have side walls, as shown at 5, tapering toward each other in a direction away from the center of the reamer body. That is, the recesses 3 and 4 are narrower at their outermost parts than at their bottoms, or innermost parts. They are, however, of substantially the same width from one end to the other.

The major recess 2 is adapted to receive a cutter 6 which is rotatably mounted upon a shaft or cutter pin 7. The opposite ends of the cutter pins 7 are carried in recesses formed in blocks 8 and 9, respectively, and secured therein by means of welding, as shown at 10 and 11, respectively. These blocks are so mounted upon the pin 7 as to properly confine the cutter 6 against endwise movement and yet leave it sufficiently loose to rotate freely. The blocks 8 and 9 are each provided on their portions adapted to fit within the auxiliary recesses 3 and 4 with dowel pins 12 and 13, respectively, these dowel pins being adapted to enter openings 14 and 15 formed in the bottom surfaces of the respective auxiliary recesses.

Fitting within each of the auxiliary recesses is a sliding wedging block 16, the outer surfaces of which are tapered to fit the side walls of the auxiliary recesses and the end of which, on that portion closest to the major recess, is adapted to fit against a shoulder on the outer portion of the blocks 8 and 9. Each of these wedging blocks 16 is hollowed out to receive the tongue-like parts 17 of the blocks 8 and 9 and to receive a wedge 18 between such tongue like parts 17 and the outer portion of the block 16. The under surfaces of each of the tongue like parts 17 is cut away to receive the head portion of a cotter key 19, these cotter keys being placed in position within these cut away portions prior to the time that the blocks 8 and 9 are placed in their respective auxiliary recesses.

In operation, the cutter 6 is first placed upon the cutter pin 7 and the blocks 8 and 9 are welded in place on the ends of this cutter pin by means of the welding 10 and 11. The dowel pins 12 and 13 are then positioned to project from the inner surface of the blocks 8 and 9. The sliding wedging blocks 16 are then placed in the respective auxiliary recesses and moved as far toward the opposite ends thereof as possible. The cutter assembly is now placed in position with the blocks 8 and 9 within the auxiliary recesses and with the dowel pins 12 and 13 projecting into the openings 14 and 15 to properly position the assembly.

The sliding wedging blocks 16 are now slid over the tongue like parts 17 of the blocks 8 and 9 and the wedges 18 are inserted between these tongue-like parts and the blocks 16 and driven home. The cotter keys 19 which have previously been placed in proper position will project through openings formed in the downwardly extending flanges 20 on the wedges 18 and when the wedges 18 have been driven home, these cotter keys will be expanded to hold the wedges in place.

When it is desired to remove the cutter assembly which is thus positioned in a reamer body, the cotter keys 19 are first closed and then some driving member, such as 21, placed against the flange 22 of each of the wedges 18 in succession and these wedges driven out by means of a hammer, or the like. Immediately when these wedges have been removed, the blocks 16 may be slid from their position over the tongue like parts 17 and the cutter assembly may be lifted out of the body.

Figure 5:
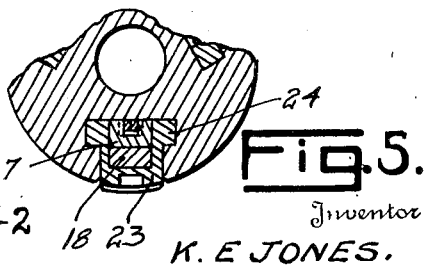
Fig. 5 is a view similar to Fig. 3, but showing a slight modification.

In the modification shown in Fig. 5, the parts and operation will be found to be identical with the exception that instead of the sliding wedging blocks 16, there is employed a block 23 which is T-shaped and has lateral extending flanges 24. The auxiliary recesses instead of having sloping or tapering side walls, have walls such that these auxiliary recesses are in the form of T-slots so as to receive the blocks 23. The same cutter assembly is employed utilizing the blocks 8 and 9 having the tongue 17 thereon and the cotter keys 19 employed in connection therewith. The wedges 18 may be identical with those previously described.

It will be seen from the foregoing that a means has been provided whereby a cutter assembly may be readily, easily and quickly mounted within a cutter body in such a manner that it cannot be readily displaced or damaged except for the usual damage incident to use, and that the number of parts has been reduced to a minimum. It is further to be noted that the cutter assembly may be made and assembled at the factory, or other place where they may be properly arranged so as to permit rotation and proper operation of the cutters, yet may be changed very readily in the field.

Having described my invention, I claim:

1. In a reamer construction, a reamer body having a major recess in its outer surface, and an auxiliary recess at each end of said major recess, each of said auxiliary recesses tapering toward a smaller dimension in a direction outward from the center of said reamer body and being of substantially uniform width from end to end, a correspondingly tapered wedging block slidably mounted in each of said recesses and having a hollowed out portion disposed toward the center of the reamer body, a cutter assembly comprising a cutter adapted to be mounted within said major recess, a cutter pin within said cutter for rotatably mounting the same and a pair of supporting blocks secured to the opposite ends of said cutter pin, each of said supporting blocks being adapted to lie within one of said auxiliary recesses and having a tongue like part adapted to be received within the hollowed out portion of the sliding block within said recess, and a wedge adapted to enter the said cut away portion of the sliding block and be wedged between that portion and the tongue like part of said supporting block.

2. In a reamer construction, a reamer body having a major recess in its outer surface, and an auxiliary recess at each end of said major recess, each of said auxiliary recesses tapering toward a smaller dimension in a direction outward from the center of said reamer body and being of substantially uniform width from end to end, a correspondingly tapered wedging block slidably mounted in each of said recesses and having a hollowed out portion disposed toward the center of the reamer body, a cutter assembly comprising a cutter adapted to be mounted within said major recess, a cutter pin within said cutter for rotatably mounting the same, and a pair of supporting blocks secured to the opposite ends of said cutter pin, each of said supporting blocks being adapted to lie within one of said auxiliary recesses and having a tongue like part adapted to be received within the hollowed out portion of the sliding block within said recess, and a wedge adapted to enter the said cut away portion of the sliding block and be wedged between that portion and the tongue like part of said supporting block, and means for securing said wedge in engaged position.

3. In a reamer construction, a reamer body having a major recess in its outer surface, and an auxiliary recess at each end of said major recess, each of said auxiliary recesses tapering toward a smaller dimension in a direction outward from the center of said reamer body and being of substantially uniform width from end to end, a correspondingly tapered wedging block slidably mounted in each of said recesses and having a hollowed out portion disposed toward the center of the reamer body, a cutter assembly comprising a cutter adapted to be mounted within said major recess, a cutter pin within said cutter for rotatably mounting the same and a pair of supporting blocks secured to the opposite ends of said cutter pin, each of said supporting blocks being adapted to lie within one of said auxiliary recesses and having a tongue-like part adapted to be received within the hollowed out portion of the sliding block within said recess, and a wedge adapted to enter the said cut away portion of the sliding block and be wedged between that portion and the tongue-like part of said supporting block, and means for positively locking said supporting blocks with respect to said body and for preventing sliding movement of said blocks with respect to said body when they have been properly positioned with respect thereto.

4. In a reamer construction, a reamer body having a major recess in its outer surface and an auxiliary recess at each end of said major recess, each of said auxiliary recesses being narrower adjacent the outer surface of said body than adjacent the bottom of the recess, a block slidingly mounted in each of said auxiliary recesses, a reamer cutter adapted to be mounted in said major recess, a cutter pin for rotatably supporting said reamer cutter, a pair of supporting blocks secured to the opposite ends of said cutter pin respectively parts of said blocks adapted to be received between said sliding blocks and the bottoms of said auxiliary recesses, and wedges for engaging between said sliding blocks and said parts of said supporting blocks to secure said supporting blocks in position.

5. In a reamer construction, a reamer body having a major recess in its outer surface and an auxiliary recess at each end of said major recess, each of said auxiliary recesses having a T-shape cross section and being narrower adjacent the outer surface of said body than adjacent the bottom of the recess, a reamer cutter adapted to be mounted in said major recess, a cutter pin adapted to rotatably support said reamer cutter, a pair of supporting blocks secured to the opposite ends of said cutter pin respectively, a block having a T-shape outer configuration in cross section slidingly mounted within each of said auxiliary recesses, each of said supporting blocks having a part adapted to lie between one of said sliding blocks and the bottom of the corresponding auxiliary recess, and wedges adapted to engage between each of said sliding blocks and the said parts of said supporting blocks to wedge said supporting blocks in place against the bottoms of said auxiliary recesses.

6. In a reamer construction, a reamer body having a major recess in its outer surface and an auxiliary recess at one end of said major recess, said auxiliary recess being narrower adjacent the outer surface of said body than adjacent the bottom of the recess, a block slidingly mounted in said auxiliary recess, a reamer cutter adapted to be mounted in said major recess, a cutter pin for rotatably supporting said reamer cutter, a supporting block on one end of said cutter pin, part of said supporting block being adapted to be received between said sliding block and the bottom of said auxiliary recess, and a wedge for engaging between said sliding block and said part of said supporting block to secure said supporting block in position.

KENNETH E. JONES.